United States Patent
Boucher et al.

(10) Patent No.: US 6,904,798 B2
(45) Date of Patent: Jun. 14, 2005

(54) MULTI-FUNCTIONAL MARINE SENSING INSTRUMENT

(75) Inventors: Stephen G. Boucher, Amherst, NH (US); Robert M. Cullen, Temple, NH (US); Jun Lan, Milford, NH (US)

(73) Assignee: Airmar Technology Corporation, Milford, NH (US)

( * ) Notice: Subject to any disclaimer, the term of this patent is extended or adjusted under 35 U.S.C. 154(b) by 0 days.

(21) Appl. No.: 10/630,625

(22) Filed: Jul. 30, 2003

(65) Prior Publication Data

US 2004/0074294 A1 Apr. 22, 2004

Related U.S. Application Data

(60) Provisional application No. 60/429,514, filed on Nov. 26, 2002, and provisional application No. 60/402,493, filed on Aug. 8, 2002.

(51) Int. Cl.[7] .............................................. G01P 13/00
(52) U.S. Cl. .................................................. 73/170.02
(58) Field of Search ........................ 73/170.02, 170.03, 73/170.11, 170.13, 181, 185, 187, 861.78, 861.79, 861.81

(56) References Cited

U.S. PATENT DOCUMENTS

| | | | |
|---|---|---|---|
| 4,455,503 A | | 6/1984 | Nakatani |
| 4,836,020 A | | 6/1989 | Boucher |
| 5,182,952 A | | 2/1993 | Pyzik |
| 5,235,557 A | | 8/1993 | Masreliez |
| 5,581,025 A | * | 12/1996 | Boucher et al. ............. 73/187 |
| 5,719,824 A | | 2/1998 | Boucher |
| 5,838,635 A | | 11/1998 | Masreliez |

FOREIGN PATENT DOCUMENTS

| | | |
|---|---|---|
| DE | 44 12 964 A1 | 10/1994 |
| DE | 100 09 644 A1 | 9/2001 |
| EP | 0 973 150 A2 | 1/2000 |

OTHER PUBLICATIONS

Transom Mount. Airmar Technology Corporation. [online], 2000 #17–1205, [retrieved on Mar. 31, 2004]. Retrieved from the Internet,<URL:http://www.airmar.com/pdfs/cat/marine/transom_mount/transom.pdf>.

* cited by examiner

Primary Examiner—William Oen
(74) Attorney, Agent, or Firm—Hamilton, Brook, Smith & Reynolds, P.C.

(57) ABSTRACT

A marine sensor device mounts in a single opening in a hull of a marine vessel. The sensor includes a housing secured in the opening. Positioned within the housing is a body containing at least two sensors. The body is removable from the housing. A magnetized paddlewheel can be disposed in a first cavity formed on a first half of the body, the paddlewheel has a plurality of paddles extending from a circular central hub and rotatably mounted on an axle extending transverse a fore and aft direction of travel of the vessel. A magnetic sensor can be located adjacent the paddles, the magnetic sensor senses the rotation of the paddles and provides speed indications. The magnetic sensor can be a Hall-effect device. A sonic transducer for depth detection can be disposed within a second cavity formed on a second half of the body. A thermal sensor for sensing water temperature can be disposed in a well formed in the body.

18 Claims, 11 Drawing Sheets

-3dB Beamwidth: 28°
-6dB Beamwidth: 41°
-10dB Beamwidth: 80°

MULTI-FUNCTIONAL MARINE SENSING INSTRUMENT

RELATED APPLICATIONS

This application claims the benefit of U.S. Provisional Application No. 60/429,514, filed Nov. 26, 2002 and U.S. Provisional Application No. 60/402,493, filed Aug. 8, 2002 and includes the disclosures discussed in U.S. Pat. No. 4,898,029, issued Feb. 6, 1990, which is a continuation of U.S. Pat. No. 4,836,020, issued Jun. 6, 1989, which reissued on Jul. 7, 1992 as Re. 33,982, and which is a continuation of U.S. application Ser. No. 7,527, filed Jan. 28, 1987, now abandoned, the entire teachings of which are incorporated herein by reference.

BACKGROUND OF THE INVENTION

There are many types of marine sensors available for commercial and pleasure craft today. Some of them include instruments for measuring water depth, boat speed, water temperature, as well as, locating fish. Certain depth measuring devices employ an ultrasonic transducer that emits an acoustic beam downwardly from the boat. When the beam strikes something, such as the bottom, the beam reflects an echo back to the transducer. This is converted into electrical energy, amplified and displayed as information on a screen. The information can be displayed on a paper graph, flashing device, or video display.

For the most part, speed, depth, and temperature measuring instruments were three separate devices that required drilling three holes in the hull. Today, these measuring sensors have been combined into a single instrument which provides information with respect to all three parameters of speed, temperature, and depth. However, these single instruments do not allow the sensors to be readily removable from within the hull. In particular, the depth sensor cannot be removed while the vessel is afloat because the size of the transducer element is greater than the opening in the hull.

Despite the above efforts, and that of other workers in the art, a need exists for a through-hull device with that allows the sensing components to be removable from within the hull while the vessel is afloat.

SUMMARY OF THE INVENTION

A marine sensor device mounts in a single opening in a hull of a marine vessel. The sensor includes a housing secured in the opening. Positioned within the housing is a body containing at least two sensors. The body is removable from the housing. A magnetized paddlewheel can be disposed in a first cavity formed on a first half of the body, the paddlewheel has a plurality of paddles extending from a circular central hub and rotatably mounted on an axle extending transverse a fore and aft direction of travel of the vessel. A magnetic sensor can be located adjacent the paddles, the magnetic sensor senses the rotation of the paddles and provides speed indications. The magnetic sensor can be a Hall-effect device. A sonic transducer for depth detection can be disposed within a second cavity formed on a second half of the body. A thermal sensor for sensing water temperature can be disposed in a well formed in the body.

In some embodiments, the cross-sectional area of the paddles in a plane transverse a direction of flow of water being traversed by the marine vessel and in a plane parallel the direction of flow versus the available cross sectional area in the respective planes define a Cross-Sectional ratio having a range between about 0.25 and 0.5. Moreover, the lowest point on the periphery of the hub can be located tangentially adjacent to or vertically above the lowest point in the first cavity. It is important to maintain the Cross-Sectional ratio is preferably maintained between 0.25 and 0.5 to reduce the build-up of negative cavity pressure and thus minimize the tendency to cavitate within the cavity at high speeds.

In some embodiments, the Cross-Sectional ratio in the plane parallel to the direction of flow is different than the Cross-Sectional ratio in the plane transverse the direction of flow. In other embodiments, the Cross-Sectional ratio in the plane parallel to the direction of flow is about equal the Cross-Sectional ratio in the plane transverse the direction of flow. The first cavity can be an asymmetric cavity The transducer can be a piezoelectric element having an aspect ratio defined in terms of the length, width, and height of the piezoelectric element. The aspect ratio being optimized such that the maximum acoustic energy of the element is produced when the element vibrates with a frequency of about 150 kHz to about 250 kHz. The maximum acoustic energy of the piezoelectric element is produced when the element vibrates with a frequency of about 235 kHz. In some embodiments, the piezoelectric element can be made of PZT.

In one embodiment, the length of the piezoelectric element can be about 1.0 to 1.3 inches in length, about 0.1 to 0.5 inches in height, and about 0.1 to 0.5 inches in width. In another embodiment, the length of the piezoelectric element can be about 1.25 inches, the height is about 0.23 inch, and the width is about 0.22 inch. The transducer can have a beamwidth of about 11°×38° at about −3 dB.

The sensor body is disposed in a housing that fits into a single circular opening through a hull of the vessel. The housing contained at least two removable sensors, a speed sensor and a depth sensor. Optionally, a temperature sensor may be disposed in the housing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5Ba is another bottom view of the tubular body illustrating the cross sectional area of a cavity of the body as occupied by a paddle of a paddlewheel speed sensor.

FIG. 5B*b* is a detailed view of the cross sectional area of the cavity identified in FIG. 5B*a* as occupied by the paddle.

FIG. 5B*c* is a detailed view of the cross sectional area of the cavity identified in FIG. 5B*a* when not occupied by the paddle.

FIG. 5D*a* is a detailed view of the cross sectional area of the cavity identified in FIG. 5D as occupied by the paddle.

FIG. 5D*b* is a detailed view of the cross sectional area of the cavity identified in FIG. 5D when not occupied by the paddle.

DETAILED DESCRIPTION OF THE INVENTION

Figure 1:
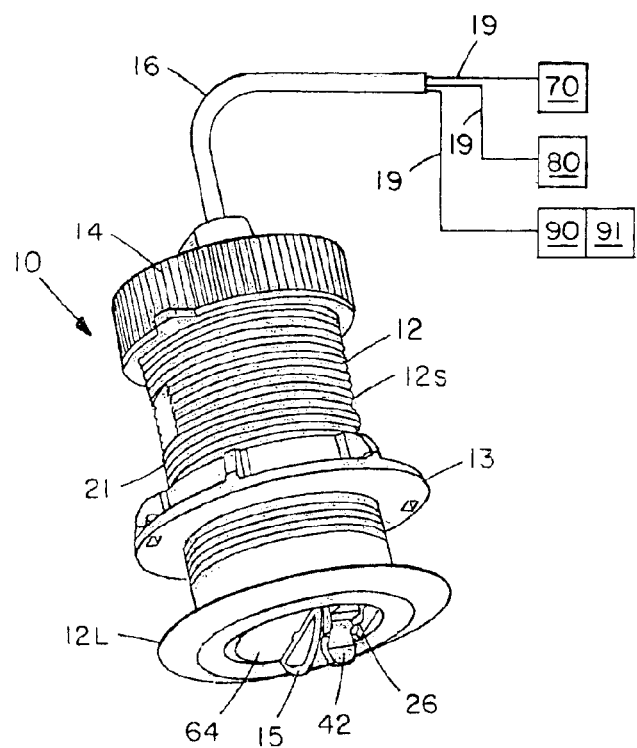
FIG. 1 is a perspective view of a high speed through-hull speed sensor of one embodiment of the invention.
Figure 2:
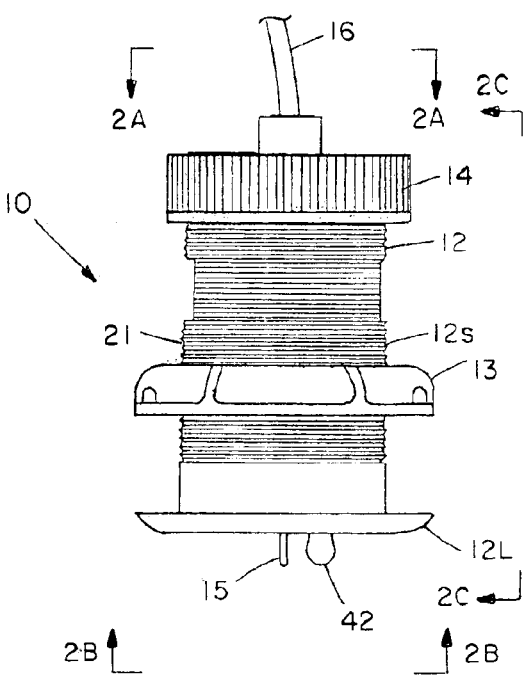
FIG. 2 is a front view of the sensor of FIG. 1.
Figure 2A:
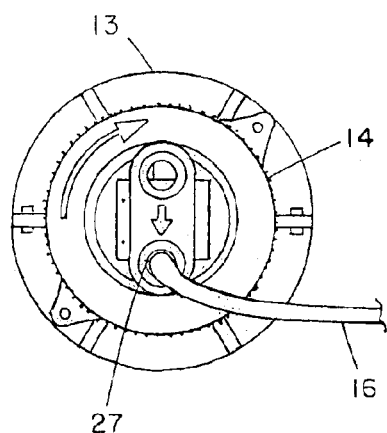
FIG. 2A is a top view of the sensor along the line 2A—2A of FIG. 2.
Figure 2B:
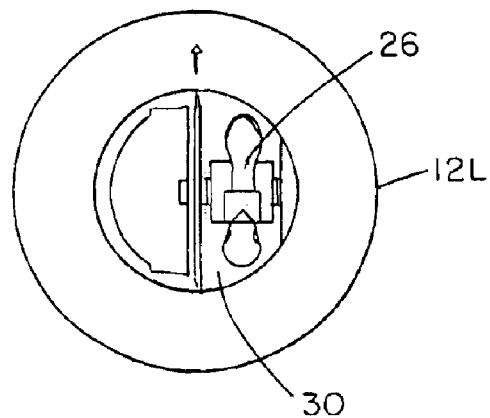
FIG. 2B is a bottom view of the sensor along the line 2B—2B of FIG. 2
Figure 2C:
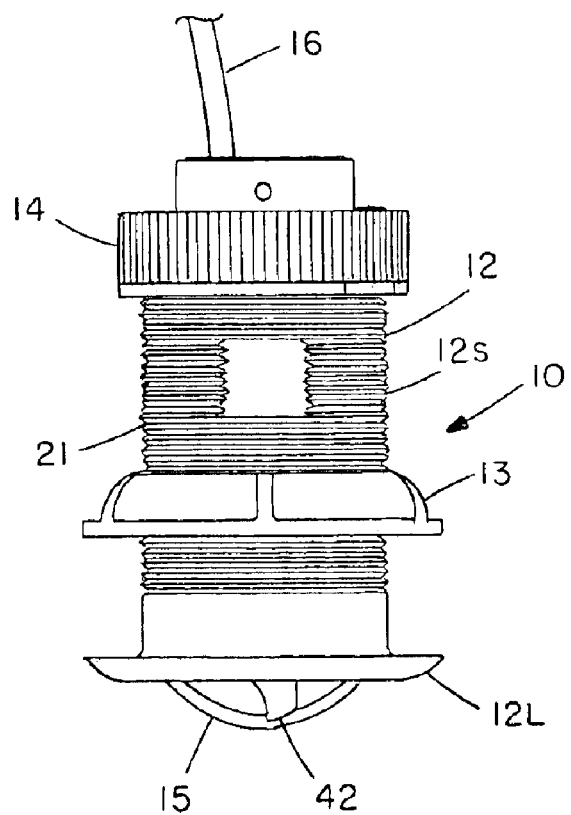
FIG. 2C is a side view of the sensor along the line 2C—2C of FIG. 2.
Figure 3:
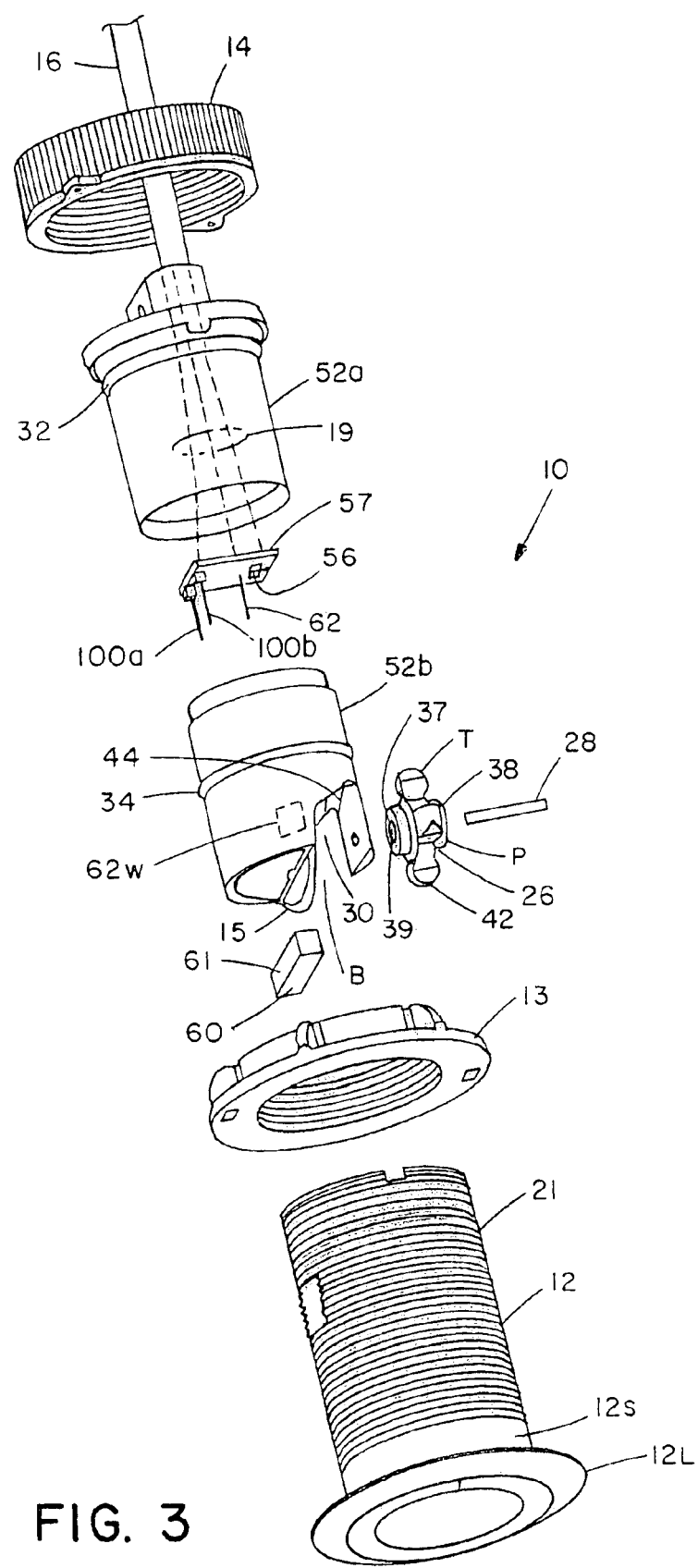
FIG. 3 is an exploded view of the sensor of FIG. 1.

Referring now to FIGS. 1–3, there is shown a high speed through-hull tri-sensor device 10 for marine vessels. The device 10 can be mounted through a hull of the marine vessel. The device 10 has a housing designated, generally, by the numeral 12, the housing 12 having a vertically extending threaded cylinder 12S, and lower flared portion 12L, respectively. The illustrated sensor device 10 is shown by way of example only. The invention is not limited for use in such a device, the present invention can be used in any other suitable sensor device, such as, for example, a transom mounted sensor.

The threaded cylinder 12S is positioned in an opening through the hull. A hull nut 13 with internal threads engage a set of external threads 21 on the exterior periphery of the threaded cylinder 12S. When the device 10 is positioned in the hull, the hull is wedged between the hull nut 13 and the flared portion 12L.

Figure 4:
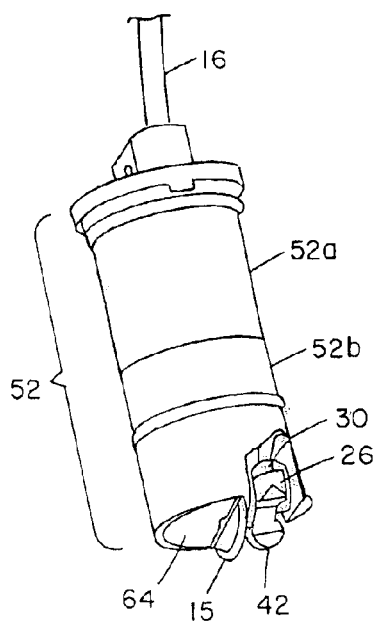
FIG. 4 is a perspective view of an inner tubular body of the sensor of FIG. 1.
Figure 5:
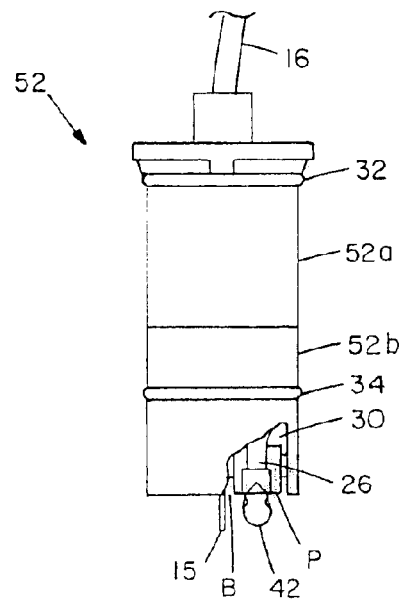
FIG. 5 is a front view of the tubular body of FIG. 4.
Figure 5A:
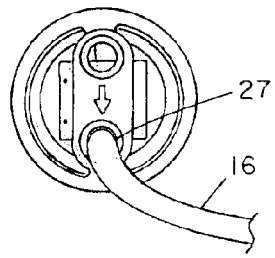
FIG. 5A is a top view of the tubular body along the line 5A—5A of FIG. 5.
Figure 6:
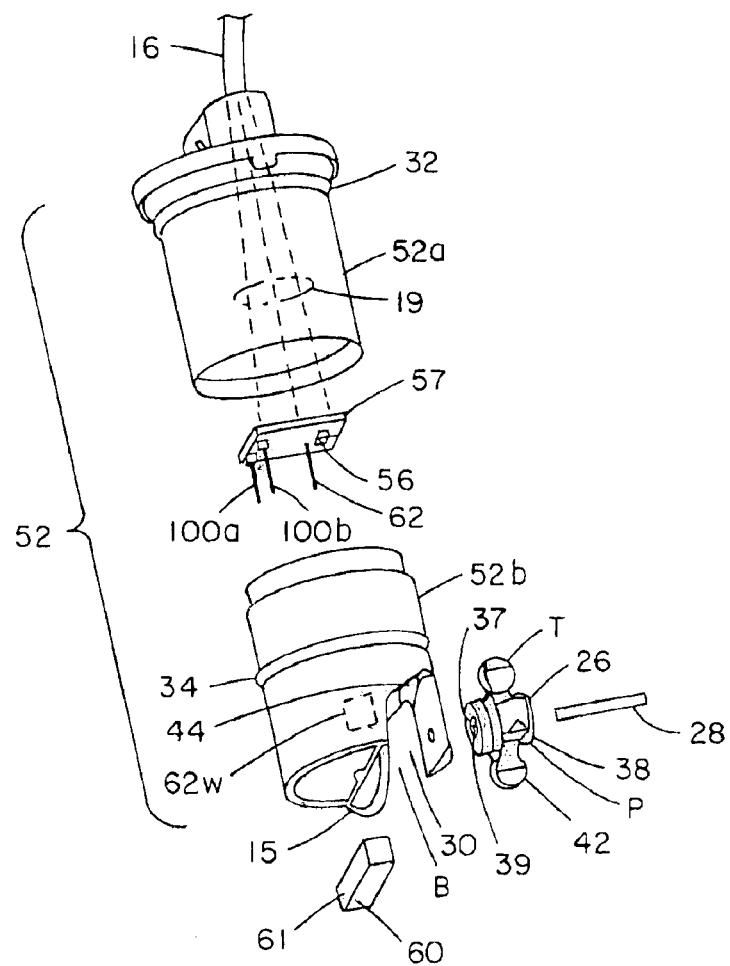
FIG. 6 is an exploded view of the tubular body of FIG. 4.

Referring also to FIGS. 4–6, a tubular body 52 is shown having an upper portion 52*a* and a lower portion 52*b*, the lower portion 52*b* forming an asymmetric paddlewheel cavity 30. The paddlewheel cavity 30 is positioned on one side of the lower portion 52*b* of the body and is considered to be asymmetric as contrasted to the paddlewheel cavity of prior art devices which used the entire lower portion of the circular tube. The body 52 is adapted to slide into the threaded cylinder 12S. O-rings 32 and 34, respectively, are positioned in grooves on the periphery of the body 52 and form a fluid-tight seal between the body 52 and threaded cylinder 12S. The body 52 is of tubular shape and is formed of metal or plastic. A cap 14 with internal threads engage with the threads 21 so that the cap 14 can be hand tightened onto the threaded cylinder 12S to seal the tubular body 52 within the threaded cylinder 12S.

Figure 5B:
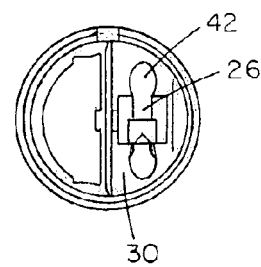
FIG. 5B is a bottom view of the tubular body along the line 5B—5B of FIG. 5.
Figure 5B:
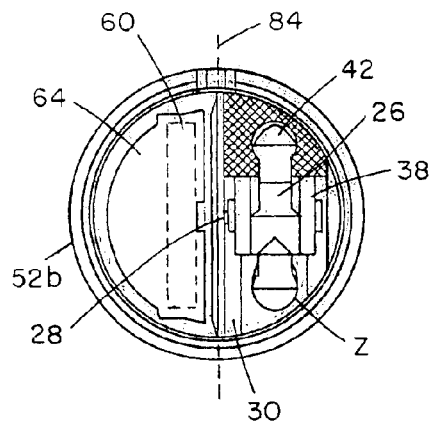
Figure 5B:
Figure 5C:
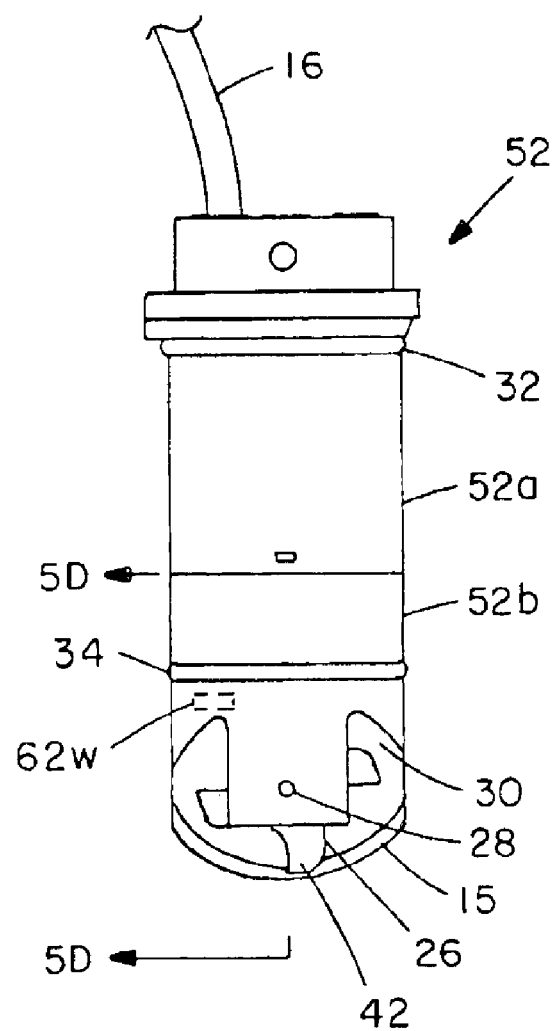
FIG. 5C is a side view of the tubular body.

A cable 16 containing wires 19 (FIGS. 1 and 6) is coupled through a bored hole 27 formed in an enlarged wall of the threaded cylinder 12S. The wires 19 provide electrical connection to components, such as a Hall-effect device 56, a transducer 60, and a thermistor 62 (FIG. 5C), each of which are positioned within the lower tube portion 52*b*.

Referring in particular to FIGS. 3 and 6, a paddlewheel 26 is mounted on axle 28 within the asymmetric cavity 30 formed in the lower tube portion 52*b*. The paddlewheel 26 is an integral structure having a hub 38 from which four symmetric shaped paddles 42 extend about the periphery thereof. The axle 28 rotates within bearings 37 disposed in a bore 39 which extends through a central opening in the hub 38, and into opposing recessed holes in the cavity side walls formed in the lower tube portion 52*b*. The paddlewheel 26 is thereby rotatably suspended within the cavity 30. In some embodiments, the paddlewheel 26 is formed of amorphous magnetized material, such as barium ferrite. The paddles 42 can be polarized with respect to the hub 38, or with respect to each other. As the paddles 42 rotate about the axle 28 when the vessel traverses the water, the variation in magnetic field is sensed by the Hall-effect device 56 mounted on a support board 57 positioned in the lower tube portion 52*b*.

The flared portion 12L is mounted flush against the outer surface of the hull to prevent impact with objects as the marine vessel moves through the water. A skeg 15 extends from the lower tube portion 52*b* of the body 52 to straighten the flow of water past the paddlewheel 26, for example, when the vessel, such as sail boat heels over as it moves through the water.

Also, a preferred location for the Hall-effect device 56 is within the lower tube portion 52*b* adjacent the cavity 30, where it can be encapsulated and protected from the water. Therefore, the tubular body 52 in some embodiments is constructed of material that is permeable to the magnetic field emanating from the paddlewheel.

Figure 6A:
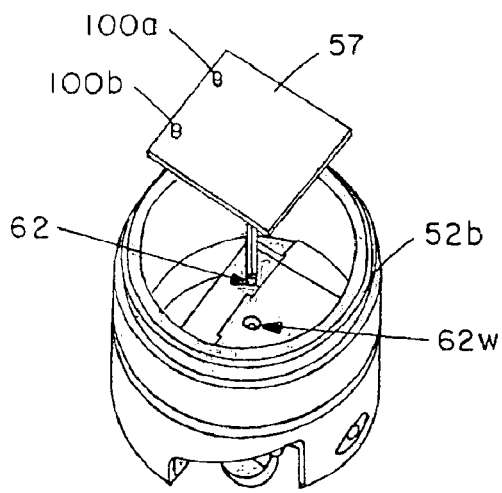
FIG. 6A is a detailed view of a support board and a lower tube portion of the tubular body of FIG. 4

The thermal sensing device 62 and Hall-effect device 56, can be of the types as described in U.S. Pat. No. 4,555,938, the entire contents of which are incorporated herein by reference, and are electrically coupled respectively via wires 19 to a temperature display 80 and a speed display 70 by way of terminals 100*a* and 100*b* extending from the board 57 (see, in particular, FIGS. 1, 3, 6, and 6A). The thermal sensing device 62 and the Hall-effect device 56 are contained within the lower tube portion 52*b* of the tubular body 52. The thermal sensing device 62 extends from the board 57 and is positioned within a well 62*w* (FIG. 6A) of the lower tube portion 52*b*.

The upper wall 44 (FIGS. 3 and 6) of cavity 30 is an arched surface, closely spaced from the tip T of the four paddles 42 as they rotate about axle 28. The periphery P of the hub 38 is approximately flush with the bottom surface B of the cavity. The types of paddlewheels that can be used in the present invention are described in detail in U.S. Pat. Nos.

4,898,029, 4,836,020, and Re. 33,982, all of the contents of which are incorporated herein by reference.

Note however that to further minimize build-up of negative cavity pressure and thus reduce the tendency to cavitate within the cavity at higher speeds, the cross-sectional shape 80 of the paddles 42, in the present embodiment is changed from the above-referenced art. The cross-sectional shape taken in a plane parallel the direction of flow versus the available cross-sectioned space 82 in the cavity 30 in the same plane, i.e., Cross-Sectional Ratio, is preferably and optionally between about 0.25 to 0.5. This ratio is in the order of 0.30. This ratio is achieved by using a relatively thin cross-sectional paddle and by symmetrically rounding off the side walls Z of the paddles at the tips and symmetrically removing material from the sidewalls as they join the hub. This reduces the numerator of the ratio, i.e., paddle cross-section.

Note also that the cavity 30 has an asymmetric shape, which results from positioning the paddlewheel 26 off-center relative to a center plane 84 extending along the length of the tubular body 52, that is, extending into the page. This arrangement as well as the small size of the transducer 60 has the particular advantage of placing the transducer 60, thermal sensing 62, and Hall-effect device 56, as well as the paddlewheel 26, all within a single structure, namely, the tubular body 52, and more particularly, the lower portion 52b of the tubular body 52.

Figure 5D:
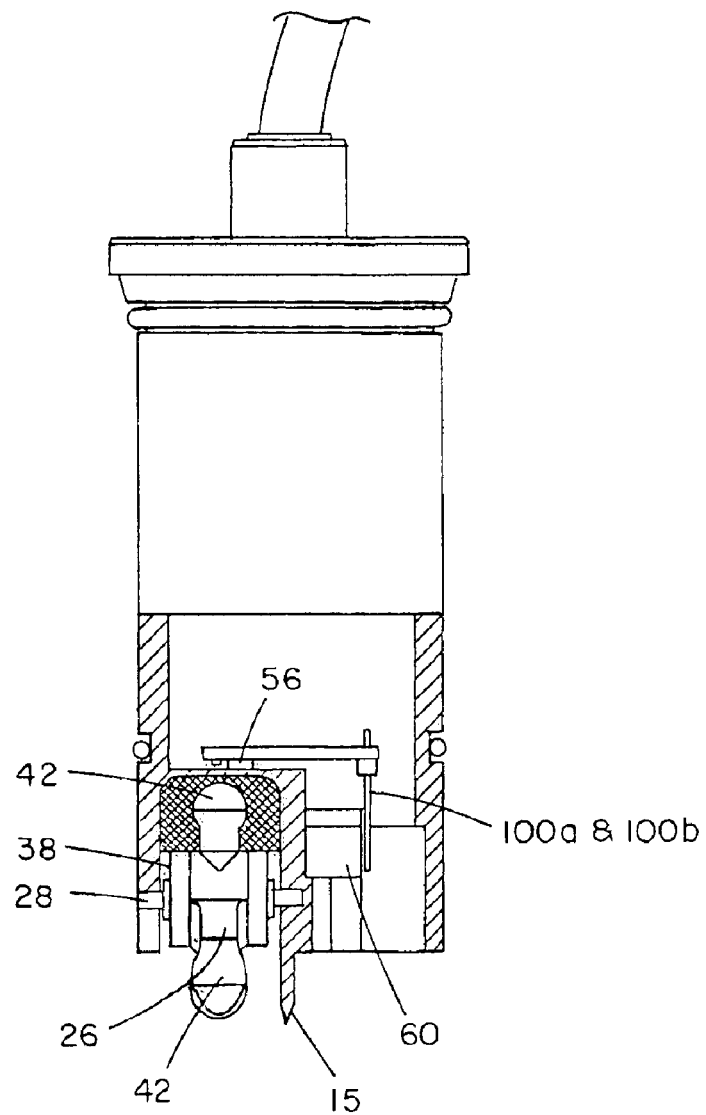
FIG. 5D is a partial cutaway side view of the tubular body shown as shown in FIG. 5C, the partial view being taken along the line 5D—5D with the paddlewheel fully shown illustrating the cross sectional area of the cavity of the body as occupied by a paddle of a paddlewheel speed sensor.
Figure 5D:
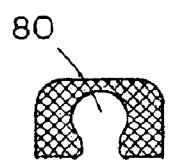
Figure 5D:
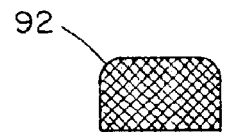

Also note that the Cross-Sectional Ratio may vary within the cavity 30, as illustrated in FIGS. 5D, 5Da, and 5Db. Although the cross-sectional shape 80 of the paddles 42 is the same when taken in a plane transverse the direction of flow (FIG. 5Da), the available cross-sectioned space 92 (FIG. 5Db) in the cavity in the same plane can be different than the available cross-sectioned space 82 shown in FIG. 5Bc. As such, the Cross-Sectional Ratio for the plane of FIG. 5D is about 0.34. However, in some embodiments the Cross-Sectional Ratio is the same for both planes, even though the shape of the cross-sectioned shapes 82 and 92 are different.

Figure 8:
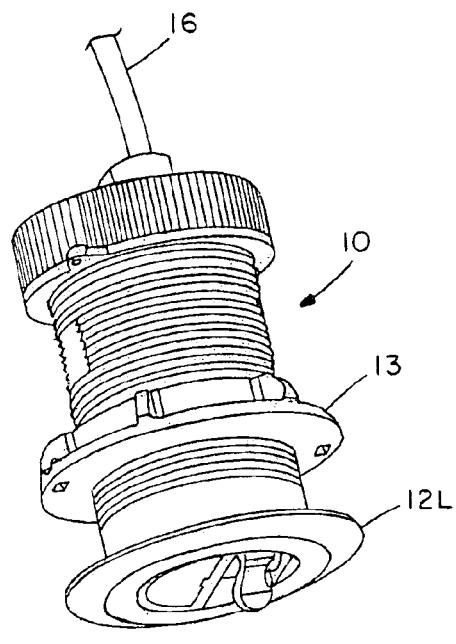
FIG. 8 is a perspective view of the sensor with no skeg in accordance with the invention.
Figure 7:
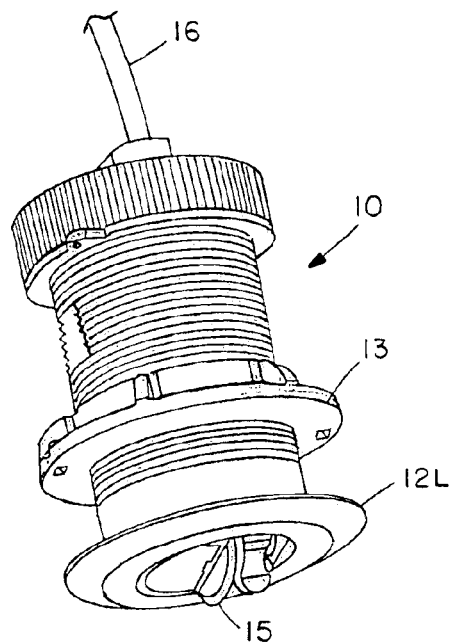
FIG. 7 is a perspective view of the sensor with a single center skeg in accordance with the invention.
Figure 9:
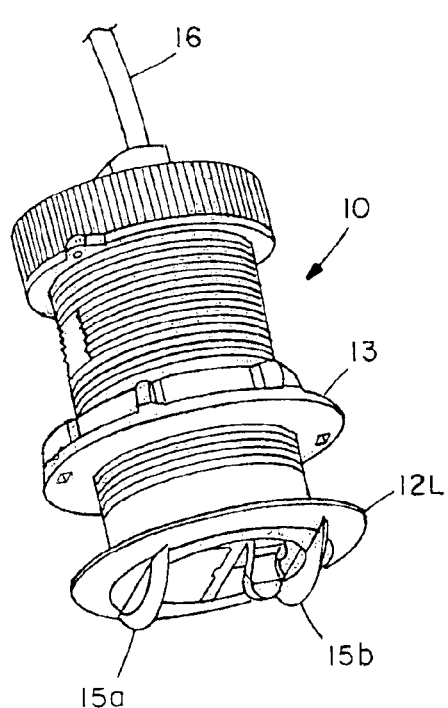
FIG. 9 is a perspective view of the sensor with two outer skegs in accordance with the invention.
Figure 10:
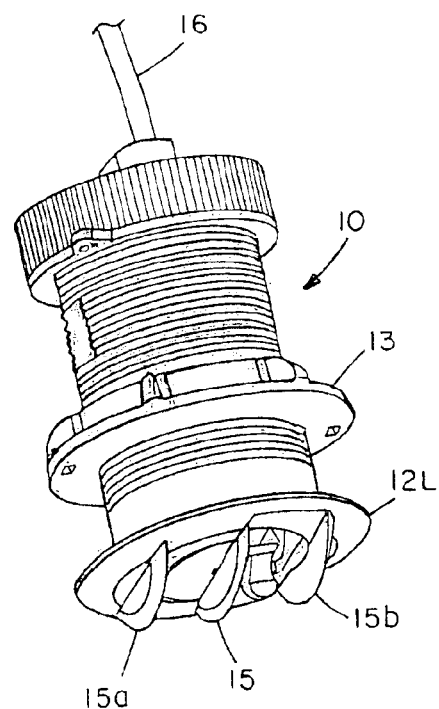
FIG. 10 is a perspective view of the sensor with a center and two outer skegs in accordance with the invention.

FIGS. 8–10 show alternate embodiments of the device discussed above. Recall that a single skeg 15 was positioned at the center of lower portion 12L of the sleeve 12 (shown again in FIG. 7 for reference). However, there can be more than one skeg located at different positions on the lower portion 12L. For example, as shown in FIG. 9, there are a pair of parallel skegs 15a and 15b located near respective outer regions of the lower portion 12L. These can also be combined with the center skeg 15 as shown in FIG. 10. Optionally, in some implementations, the device 10 does not include a skeg as illustrated in FIG. 8.

Figure 11:
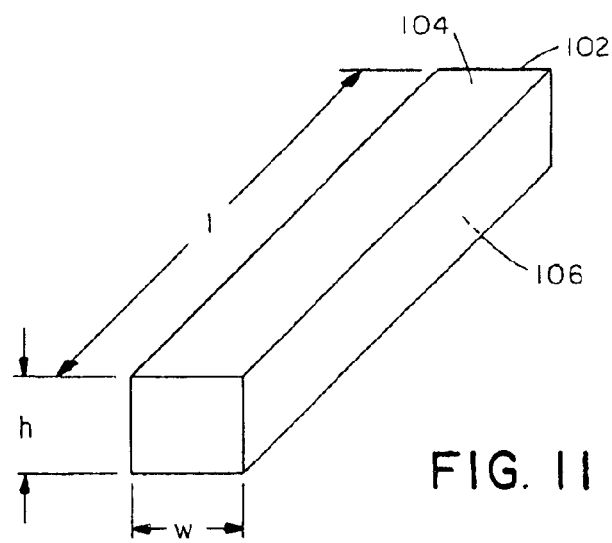
FIG. 11 is a perspective view of the ultrasonic transducer of the sensor of FIG. 1.

Referring to FIG. 11, the transducer 60 is formed of a piezoelectric element 102 coated with an upper and lower layer of silver 104, 106 that provides an electrical connection with terminals 100a and 100b on board 57 (FIGS. 3, 6) to an electronic driver assembly 90 (FIG. 1) associated with a depth indicator 90 (FIG. 1). The transducer 60 is made to fit within the lower tube portion 52b of the body 52 such that the body can be removed from the housing 12 while the vessel is afloat. Other than the radiating face (not shown), the piezoelectric element 102 is enclosed in a resilient backing member 61 (FIGS. 3, 6), preferably consisting of cork material or an equivalent material. That is, the backing member 61 encloses the piezoelectric element 102 at the top and sides of the generally rectangular piezoelectric crystal 102. The piezoelectric element 102 can be made from well-know lead zirconate titanate material, barium titanate material or other equivalent material.

The purpose of the backing member 61 enclosing the top and side walls of the piezoelectric element 102 is to provide a barrier against unwanted transmission of acoustic waves toward the top of the enclosure, rather than in the preferred direction, out the bottom. Hence, the backing member 61 acts as a pressure release material as if the top and sides of the piezoelectric element are pushing against air, while the bottom, or radiating face effectively vibrates or pushes against the water.

The entire inner portion of the housing is encapsulated in potting material 64 (FIGS. 1, 4), such as polyurethane to ensure water-tight encapsulation and at the same time, provide a path for acoustic energy from the piezoelectric element 102 to travel unimpeded out the bottom of the housing.

In a typical operation, a drive voltage from the drive assembly 90 is applied across the upper and lower layers 104, 106 of the transducer 60 at a frequency of about 235 kHz for about 100 to 1000 $\mu$sec. After which, the drive voltage stops, such that the transducer 60 waits for the echo to be reflected from the bottom of the body of water back to the transducer 60. By determining the time difference between the transmission of the ultrasonic signal and the detection of the echo, the depth indicator 91 (FIG. 1) calculates the depth of the water.

Figure 12:
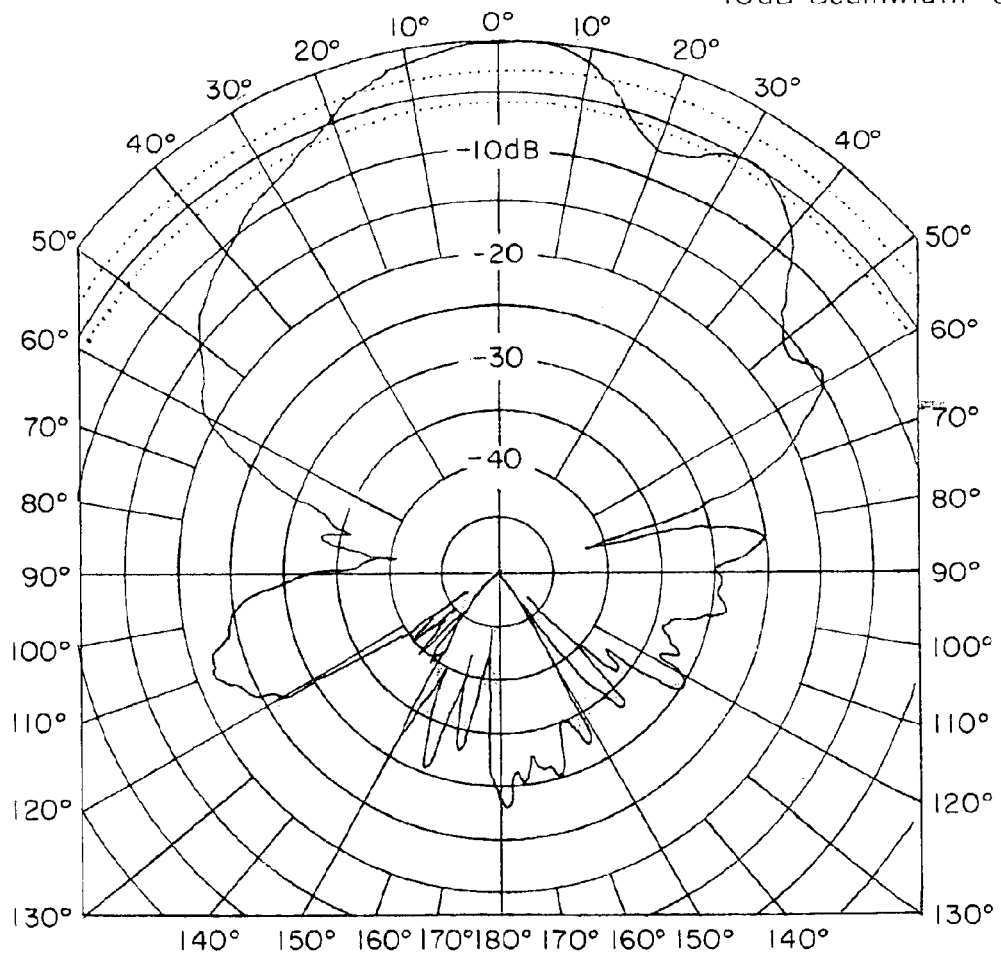
FIG. 12 is a plot of the athwartships beam pattern of the transducer of FIG. 11.

A particular feature of the sensor 10 is that the speed sensor, depth sensor, and temperature sensor all fit within the housing or tubular body 52 that fits through a single opening in the hull of the vessel. Hence, the relationship between the height (h), width (w), and length (l) of the piezoelectric element 102, or aspect ratio, is optimized such that the ultrasonic transducer 60 fits within the lower tube portion 52b in one orientation while the acoustic energy from the transducer 60 is maximized at a particular frequency, in this case, 235 kHz. In this way, the transducer 60 provides broad beam coverage athwartships, as shown in FIG. 12, so that depth reading is substantially immune to the rolling of the boat and substantially immune to the dead rise angle where the transducer is mounted. The longitudinal beam is optimized for high acoustic signal by making its length as large as possible (within the space available), consistent with good piezoelectric coupling to the water as described in the next paragraph. The word "coupling" means how effectively an electrical signal can be converted to an acoustic signal in water (as well as the reverse, how effectively an acoustic signal can be converted into an electrical signal). More explicitly, these interactions are called 'transmit' and 'receive' as specific functions. The objective of the FEA analysis is to design a transducer so that it is efficient in both functions. In other words, the objective is to design transducer dimensions to produce strong 'coupling' between electrical and acoustical signals.

The dimensions of the piezoelectric element 102 are critical to the device's performance because these dimensions greatly influence how effective the piezoelectric element is in transmitting and receiving acoustic signals. Selection of these dimensions is based on detailed modeling, which is used to predict which vibration modes of the element (among a multiplicity of vibration modes) can optimally transmit and receiver acoustic signals in the water. [Some (undesired) vibration modes couple poorly to water even though these modes have strong vibrations.] Optimization of acoustic coupling is based on modeling by a mathematical technique known as finite element analysis (FEA). Airmar has refined the FEA technique so that the model can predict several important features: the frequency of the vibration, the shape of the vibration, the strength of acoustic signals, the acoustic beam pattern, and electrical impedance of the element. Each of these features is important in the transducer's overall performance. Transducer designers iterate the dimensions until they have achieved the best performance. Examples of Airmar's modeling process are described in detail in "Proceedings of the 1994 IEEE Ultrasonics Symposium," Cannes, France, pp. 999–1003, catalog 94CH3468-6; "Proceedings of the 1998 IEEE Ultrasonics Symposium," Sendai, Japan, pp. 1051–1055, catalog 98CH36102; and "Proceedings of the 2001 IEEE Ultrasonics Symposium," Atlanta, Ga., pp. 467–470, catalog 01CH37263, each of which is incorporated by reference in its entirety. Other commercially available FEA software are applicable to modeling, such as ANSYS Inc., Canonsburg, Pa., which analyzes in the frequency domain, and Weidlinger Associates, Inc., Los Altos, Calif., which analyzes in the time domain.

Material properties of the piezoelectric material are provided as input parameters to the FEA model. The material properties of the piezoelectric element 102 for PZT4 are shown in Table 1, listing both "book" values commonly found in textbooks and "model" values.

TABLE 1

Material parameters for PZT4, Poled direction is along Z(or "3")

| | Density kg/m$^3$ | Mechanical Q | Dielectric loss tangent | Maximum stress kg/cm$^2$ |
|---|---|---|---|---|
| Book | 7500 | 500 | 0.005 | — |
| Model | 7650 | 750 | 0.002 | 300 |

Temperature Expansion Coefficients ($10^{-6}$/degree C)

| Non-pole direction | Pole direction |
|---|---|
| 3.8 | 1.7 |

Piezoelectric Constants ($10^{-12}$ Coulomb/Newton)

| | $d_{13}$ | $d_{33}$ | $d_{15}$ |
|---|---|---|---|
| Book | −123 | 289 | 496 |
| Model | −123 | 335 | 525 |

The "d" matrix is the charge sensitivity, related by Q = d T, where Q is the charge vector and T us the mechanical stress vector.

Dielectric Constants ($\epsilon_0$ = 8.854 * $10^{-12}$ Farad/meter)

| | $K_{11}/\epsilon_0$ | $K_{33}/\epsilon_0$ |
|---|---|---|
| Book | 1475 | 1300 |
| Model | 1490 | 1325 |

Elastic Constants ($10^{-12}$ m$^2$/Newton)

| | $S_{11}$ | $S_{12}$ | $S_{13}$ | $S_{33}$ | $S_{44}$ | $S_{66}$ |
|---|---|---|---|---|---|---|
| Book | 12.3 | −4.05 | −5.31 | 15.5 | 39.0 | 33 |
| Model | 12.2 | −3.66 | −5.25 | 15.0 | 40.5 | 32 |

The "s" matrix is the compliance of the material, related by the following coupled equation. By symmetry, $S_{ij} = S_{ji}$.
$\epsilon_i = s_{ij}T_j + d_{im}E_m$
$D_n = K_{nm}E_m + D_{nk}T_k$
where
$\epsilon$ is vector of mechanical strain
T is vector of mechanical stress
E is vector of electric field
D is vector of dielectric displacement The model values have been refined for the material properties (of PZT, for example) by iteratively adjusting the values to obtain the best match between experiment and predictions of the FEA over a number of trials. The values, deduced in this way, are typically more precise than those provided by the manufacturer, mainly because the model values are measured at the operating (ultrasonic) frequency whereas the manufacturer's values are typically measured at low frequency (below 1 kHz). When comparing theory and experiment for the "best match" of a fully assembled transducer, the resonance frequency and the acoustic sensitivity (in both transmission and reception of ultrasonic acoustic waves) are considered. In summary, the ability of FEA modeling to predict transducer performance depends of the values of the material properties used at the outset of the FEA calculation—the more accurate the material values, the more accurate are the FEA predictions.

Referring to TABLE 1, the temperature expansion coefficient is listed in the second set of numbers, and the charge sensitivity [d], listed in the third set of numbers, relates the electrical charge produced in PZT4 to the stress applied to the material. (The subscript notation is standard to those skilled in the art.) The relative dielectric constant [k] is listed in the fourth set of numbers, and the elastic compliance [s], listed in the fifth set of numbers, primarily determines the mechanical resonance frequencies of the transducer 60. Finally, the two constitutive equations shown at the end of TABLE 1 couple the mechanical and piezoelectric variables.

Figure 13:
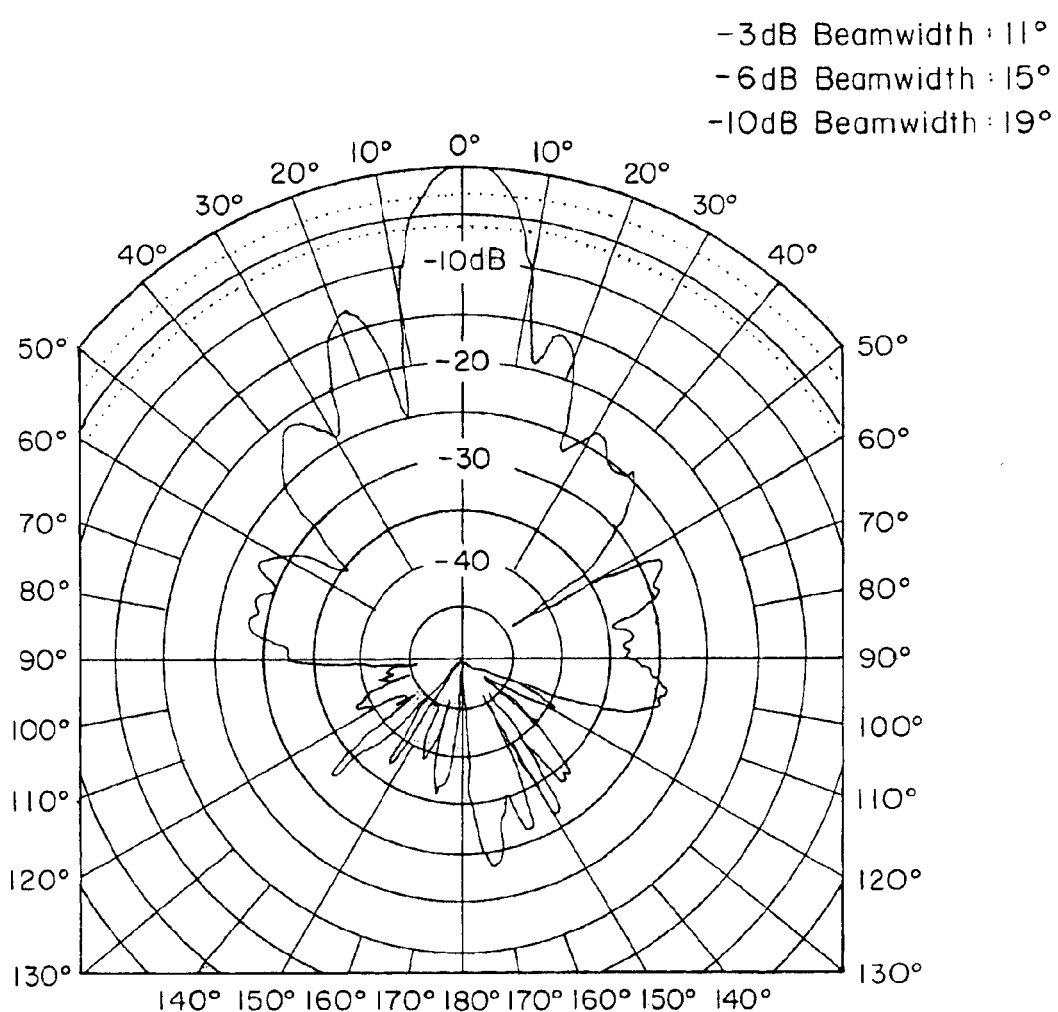
FIG. 13 is a plot of the fore aft beam pattern of the transducer of FIG. 11.
Figure 14:
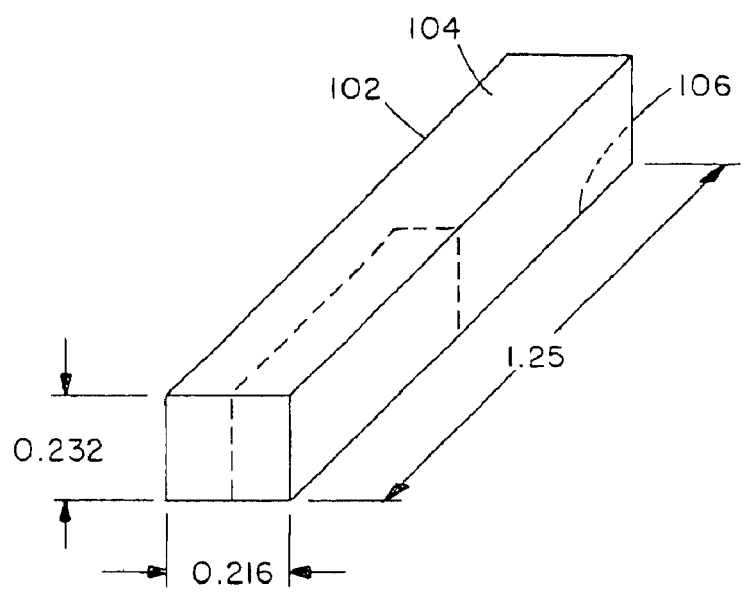
FIG. 14 is a perspective view of the ultrasonic transducer of the sensor of FIG. 1 with dimensions.
Figure 15A:
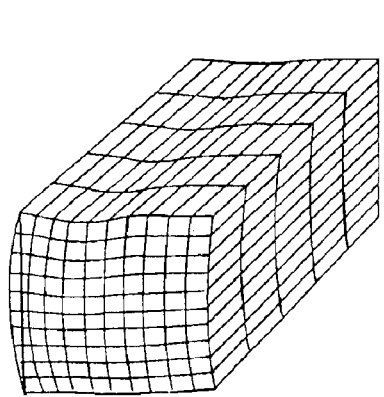
FIG. 15A is a 3-dimensional displacement map exhibiting a "good" coupling mode.
Figure 15B:
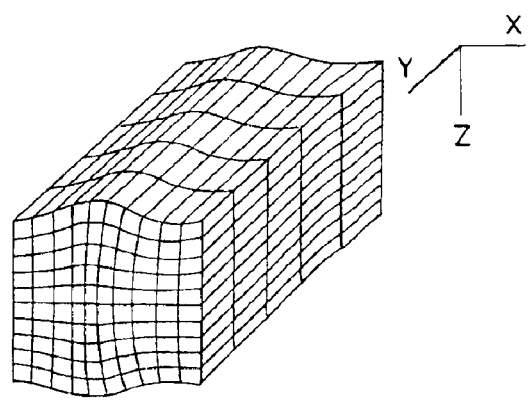
FIG. 15B is a 3-dimensional displacement map exhibiting a "poor" coupling mode.

With the above discussed FEA model, the aspect ratio of the piezoelectric element 102 is optimized for the specific material properties listed in TABLE 1. That is, the transducer designer chose dimensions and iterated these dimensions until a "high coupling" mode (FIG. 15A) was achieved. (In FIGS. 14 and 15A, only one quadrant is modeled as shown, since the other quadrants can be deduced on the basis of symmetry of element 102.) When "high coupling" occurs, most of the vibration is uniform so that a well-defined acoustic beam is formed. In comparison, "poor coupling" (FIG. 15B) occurs when the vibration is non-uniform and portions of the element are expanding while other portions are contracting (as in the undulations exhibited in FIG. 15B). In this "poor" case, only a weak acoustic beam is produced. A further requirement for an optimized mode is that no (undesired) vibration modes are found at nearby frequencies. Otherwise, the undesired modes can be inadvertently excited, and thereby weaken the desired mode. Optimized dimensions for element 102 were observed when a desired vibration mode (FIG. 15A) and desired beam patterns, as shown in FIGS. 12 and 13, were found between about 150 and 250 kHz. In a particular embodiment, the maximum acoustic signal occurred at about 235 kHz, for an element 62 having a length of about 1.25 inches, a height of about 0.23 inches and width of about 0.22 inches. For other embodiments, the length, height, and width of the element 62 can vary between 1.0 to 1.3 inches in length, 0.1 to 0.5 inches in height, and 0.1 to 0.5 inches in width depending upon the desired frequency.

While this invention has been particularly shown and described with references to preferred embodiments thereof, it will be understood by those skilled in the art that various changes in form and details can be made therein without departing from the scope of the invention encompassed by the appended claims.

What is claimed is:

1. A sensor for a marine vessel comprising:
   a housing that fits through a single opening in a hull of the vessel;
   a removable body disposed in the housing;
   a magnetized paddlewheel disposed in a first cavity formed on a first half of the body, the paddlewheel having a plurality of paddles extending from a circular central hub and rotatably mounted on an axle extending transverse a fore and aft direction of travel of the vessel;

a magnetic sensor located adjacent the paddles; and a sonic transducer disposed in a second cavity formed on a second half side of the body.

2. The sensor of claim 1, wherein the cross-sectional area of the paddles in a plane transverse a direction of flow of water being traversed by the marine vessel and in a plane parallel the direction of flow versus the available cross sectional area in the respective planes defines a Cross-Sectional ratio in a range between about 0.25 and 0.5, and wherein the lowest point on the periphery of the hub is located tangentially adjacent to or vertically above a lowest point in the first cavity.

3. The sensor of claim 2, wherein the Cross-Sectional ratio in the plane parallel to the direction of flow is different than the Cross-Sectional ratio in the plane transverse the direction of flow.

4. The sensor of claim 2, wherein the Cross-Sectional ratio in the plane parallel to the direction of flow is about equal the Cross-Sectional ratio in the plane transverse the direction of flow.

5. The sensor of claim 1, wherein the paddles are symmetric in shape.

6. The sensor of claim 1, wherein the sonic transducer is a piezoelectric element having an aspect ratio defined in terms of the length, width, and height of the piezoelectric element, the aspect ratio being optimized such that the maximum acoustic energy of the element is produced when the element vibrates with a frequency of about 150 kHz to about 250 kHz.

7. The sensor of claim 6, wherein the maximum acoustic energy of the element is produced when the element vibrates with a frequency of about 235 kHz.

8. The sensor of claim 6, wherein the length is about 1.0 to 1.3 inches in length, about 0.1 to 0.5 inches in height, and about 0.1 to 0.5 inches in width.

9. The sensor of claim 8, wherein the length is about 1.25 inches, the height is about 0.23 inch, and the width is about 0.22 inch.

10. The sensor of claim 6, wherein the transducer has a beamwidth of about 11°×38° at about −3 dB.

11. The sensor of claim 6, wherein the piezoelectric element is made of PZT.

12. The sensor of claim 1, further comprising a thermal sensor for sensing water temperature disposed in a well formed in the body.

13. A marine sensor, comprising:

a cylindrical body having a length and diameter adapted to extend along a vertical axes through a single opening in a hull of a water traversing marine vessel; which opening extends through the deck of the hull to the water;

a speed sensor disposed in a first portion of the body for sensing the speed of the vessel as it traverses the water; and a sonic transducer disposed in a second portion of the body.

14. The marine sensor of claim 13, wherein the sonic transducer is a cubic element occupying a first side of the body adjacent to the speed sensor.

15. The marine sensor of claim 14, wherein the speed sensor comprises a rotatable magnetized paddlewheel disposed adjacent to a magnetic sensor.

16. The marine sensor of claim 15, wherein the paddlewheel sensor has a plurality of paddles mounted on an axle which extends transverse a fore and aft direction of vessel travel.

17. The marine sensor of claim 15, wherein the cubic element has a length L and a width W, wherein L>W and the L dimension is disposed in the body adjacent to and facing the opening.

18. The marine sensor of claim 17, wherein the element produces a sonic beam of energy which extends mainly in the range of ±10° fore and aft the vessel and in the range of +/−60° athwart of the vessel.

* * * * *